United States Patent
Bastos et al.

(10) Patent No.: US 6,985,151 B1
(45) Date of Patent: Jan. 10, 2006

(54) SHADER PIXEL STORAGE IN A GRAPHICS MEMORY

(75) Inventors: Rui M. Bastos, Santa Clara, CA (US); Walter E. Donovan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/752,783

(22) Filed: Jan. 6, 2004

(51) Int. Cl.
*G06F 15/76* (2006.01)

(52) U.S. Cl. .................. 345/519; 345/531; 345/552; 345/557; 345/522

(58) Field of Classification Search ............. 345/426, 345/582, 501–503, 506, 519, 531, 541, 545, 345/552, 557, 536–538, 522; 711/118, 100, 711/154
See application file for complete search history.

(56) References Cited

U.S. PATENT DOCUMENTS 5,761,516 A * 6/1998 Rostoker et al. ............ 710/260
6,259,460 B1 * 7/2001 Gossett et al. .............. 345/552
6,629,188 B1 * 9/2003 Minkin et al. .............. 345/552
2003/0076320 A1 * 4/2003 Collodi ....................... 345/426

* cited by examiner

*Primary Examiner*—Kee M. Tung
(74) *Attorney, Agent, or Firm*—Townsend and Townsend and Crew LLP; J. Matthew Zigmant

(57) ABSTRACT

Circuits, apparatus, and methods that enable a shader to read and write data from and to a memory location during a single pass through a graphics pipeline. Some embodiments of the present invention provide an increase in the number of buffers available to a shader. These buffers may be read/write (input/output) or read only (input) buffers. Another provides pixel store and pixel load commands that may be used as instructions in a shader program or program portion, and may appear at positions other than the end of the shader program or program portion. Other embodiments provide a data path between a shader and a graphics memory, typically through a frame buffer interface. This data path simplifies the timing of the above store (write) and load (read) commands. Various embodiments may incorporate one or more of these features.

20 Claims, 7 Drawing Sheets

430 — MULTI  R0, R1, R2
440 — ADD    R1, R0, R1
450 — END

MORE BUFFERS =
MORE STEPS PER PASS +
FEWER PASSES

| ACTIVE CIRCUIT | ACTIVITY |
|---|---|
| 462 — REGISTERS | READ R1 |
| 464 — REGISTERS | READ R2 |
| 466 — SHADER | MULTIPLY R1 & R2 |
| 468 — REGISTERS | WRITE R1 • R2 INTO R0 |
| 472 — REGISTERS | READ R0 |
| 474 — REGISTERS | READ R1 |
| 476 — SHADER | ADD R0 & R1 |
| 478 — REGISTERS | WRITE R0 + R1 INTO R1 |
| 482 — SHADER | WRITE R0 AND R1 INTO BUFFERS |

460 ACTIVE CIRCUIT, 470 ACTIVITY

510 — MULTI RØ, R1, R2

520 — PST RØ, #Z_L

530 — ADD RØ, R3, R4

540 — PLD R1, #Z_H

550 — PLD RØ, #id           INDIRECT (FIXED)

552 — PLD RØ, @ R1          IDENTIFICATION (MOVABLE)

554 — PLD RØ, # address     DIRECT REFERENCE

556 — PLD RØ, @ R1          ADDRESS

SHADER PIXEL STORAGE IN A GRAPHICS MEMORY

BACKGROUND

The present invention relates generally to graphics systems, and more particularly to several new powerful shader program instructions.

A computer forms images for display on a monitor by combining geometries or primitives such as lines, triangles, and stripes with associated textures. In general, a graphics processor receives primitives and textures, and from them determines the color intensity of individual pixels on the monitor.

More specifically, the received primitives and textures are processed by the graphics processor during one or more passes through a graphics pipeline referred to as a GPU pass. During each pass, primitives are converted by a rasterizer into fragments, which are then combined with their associated textures by a shader circuit. After shader processing is complete, the shaded fragments are output to a raster operations circuit, which generates pixels for display. Following this, the graphics pipeline is "flushed " or cleared. During a following GPU pass, data stored during an earlier GPU pass may be read as a texture and used by the shader in fragment processing.

A recent major innovation in shader development has been the invention of a shader capable of running shader programs. This innovation has been made by NVIDIA Corporation of Santa Clara, Calif. A programmable shader receives the fragments and textures, often in the form of a "pixel quad " (four pixel 's worth of information) and runs a shader program on that information to generate shaded fragments. A shader program may be loaded into the graphics processor, for example by a driver.

Currently, a shader cannot write data directly to the frame buffer. Rather, fragment processing is completed by the shader, and shaded fragments are provided to the raster operations circuit. The raster operations circuit then writes data to the frame buffer memory, which can be read by the shader as textures during a later GPU pass. This isolation increases the number of GPU passes required to generate a complete pixel.

Accordingly, what is needed are circuits, apparatus, and methods that enable a shader to write and read data from the frame buffer memory during an individual GPU pass.

SUMMARY

Accordingly, embodiments of the present invention provide circuits, apparatus, and methods that enable a shader to write data to and read data from a memory during a single GPU pass. These memory locations may be referred to as buffers. Some embodiments of the present invention provide an increase in the amount of buffers available to the shader. This broadened concept of a destination buffer increases the flexibility of the shader, and makes the shader a general programmable device. In various embodiments, these buffers may be read/write (input/output) or read only (input) buffers.

An exemplary embodiment of the present invention provides innovative pixel store and pixel load commands. These commands may be used as instructions in a shader program or program portion, and may appear at positions other than the end of the shader program or program portion.

Other exemplary embodiments of the present invention provide a data path between a shader and a graphics memory, typically through a raster operations circuit and frame buffer interface. This innovative data path simplifies the timing of the above store (write) and load (read) commands. Various embodiments may incorporate one or more of these and the other features described here.

A further exemplary embodiment of the present invention provides an integrated circuit. This integrated circuit includes a graphics pipeline and a frame buffer interface. The graphics pipeline further includes a shader connected to a texture cache and the frame buffer interface. The shader stores and loads data from an external graphics memory using the frame buffer interface.

Another exemplary embodiment of the present invention provides a method of generating a computer graphics image. This method includes executing a first plurality of instructions in a shader program, the shader program running in a shader in a graphics pipeline, the shader program executed during a plurality of passes through the shader, executing a read command, wherein data is read from a buffer and received by the shader, and executing a second plurality of instructions in the shader program. The first plurality of instructions, the read command, and the second plurality of instructions are executed during a single pass through a graphics pipeline.

Yet another exemplary embodiment of the present invention provides another integrated circuit. This integrated circuit provides a frame buffer interface and a graphics pipeline connected to the frame buffer interface. The graphics pipeline includes a shader coupled to a texture cache. The shader may access more than two buffer storage locations in a graphics memory using the frame buffer interface.

A better understanding of the nature and advantages of the present invention may be gained with reference to the following detailed description and the accompanying drawings.

DESCRIPTION OF EXEMPLARY EMBODIMENTS

Figure 1:
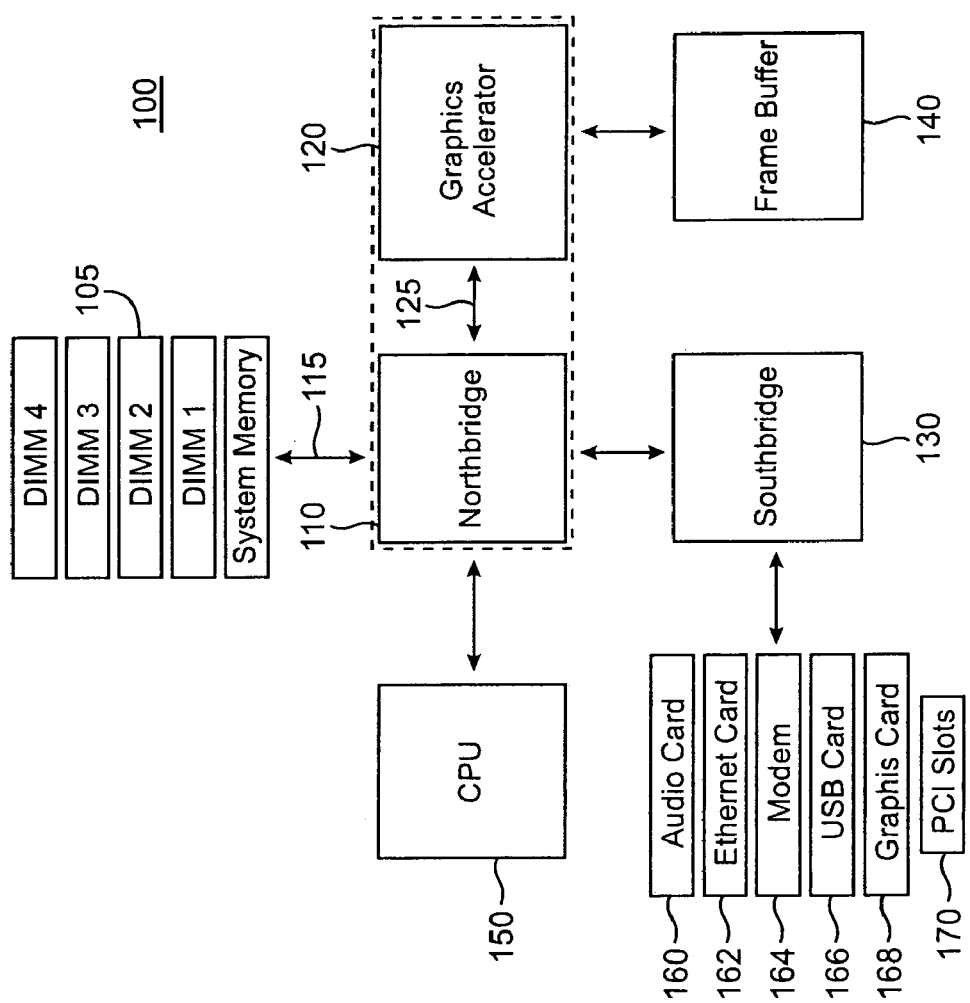
FIG. 1 is a block diagram of a computing system that benefits by incorporation of embodiments of the present invention.

FIG. 1 is a block diagram of a computing system 100 that benefits by incorporation of embodiments of the present invention. Included are a Northbridge 110, graphics accelerator 120, Southbridge 130, frame buffer 140, central processing unit (CPU) 150, audio card 160, Ethernet card 162, modem 164, USB card 166, graphics card 168, and memories 105. This figure, as with all the included figures, is shown for illustrative purposes only, and does not limit either the possible embodiments of the present invention or the claims.

The Northbridge 110 passes information from the CPU 150 to and from the memories 105, graphics accelerator 120, and Southbridge 130. Southbridge 130 interfaces to external communication systems through connections such as the universal serial bus (USB) card 166 and Ethernet card 162. The graphics accelerator 120 receives graphics information over the accelerated graphics port (AGP) bus 125 through the Northbridge 110 from CPU 150. The graphics accelerator 120 interfaces with the frame buffer 140. Frame buffer 140 includes a display buffer which stores the pixels to be displayed.

In this architecture, CPU 150 performs the bulk of the processing tasks required by this computing system. In particular, the graphics accelerator 120 relies on the CPU 150 to set up calculations and compute geometry values. Also, the audio or sound card 160 relies on the CPU 150 to process audio data, positional computations, and various effects, such as chorus, reverb, obstruction, occlusion, and the like, all simultaneously. Moreover, the CPU remains responsible for other instructions related to applications that may be running, as well as for the control of the various peripheral devices connected to the Southbridge 130.

Figure 2:
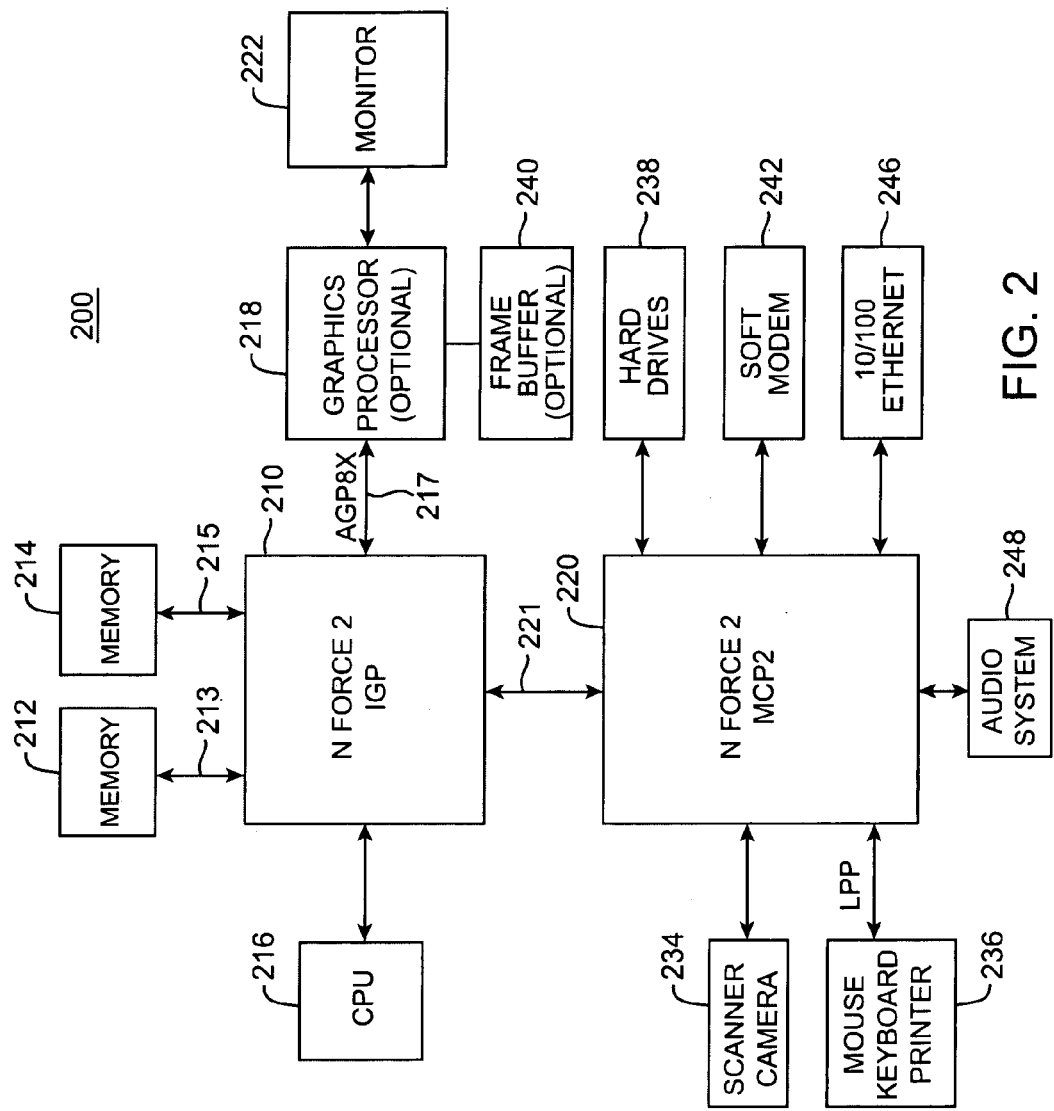
FIG. 2 is a block diagram of an improved computer system that benefits by incorporation of embodiments of the present invention.

FIG. 2 is a block diagram of an improved computer system that benefits by incorporation of embodiments of the present invention. Included are an NVIDIA nForce™2 integrated graphics processor (IGP) 210, an NVIDIA nForce2 media communications processor (MCP) 220, memory 212 and 214, CPU 216, optional graphics processor 218, monitor 222, home phoneline network 232, scanner or camera 234, mouse, keyboard, and printer 236, hard drives 238, soft modem 242, Ethernet network 246, and audio system 248.

This revolutionary system architecture has been designed around a distributed processing platform, which frees up the CPU 216 to perform tasks best suited to it. Specifically, the nForce IGP 210 includes a graphics processing unit (GPU) (not shown) which is able to perform graphics computations previously left to the CPU 216. Also, nForce MCP 220 includes an audio processing unit (APU), which is capable of performing many of the audio computations previously done by the CPU. In this way, the CPU is free to perform its removing tasks more efficiently. Also, by incorporating a suite of networking and communications technologies such as the home phoneline network 232, USB, and Ethernet 246, the nForce MCP 220 is able to perform much of the communication tasks that were previously the responsibility of the CPU 216.

In this architecture, the nForce IGP 210 communicates with memories 212 and 214 of over buses 213 and 215. These buses include address and data lines. In a specific embodiment, these address lines are 15 and 14 bits wide, while the data lines are 64 bits wide. This architecture is referred to as the Twinbank™ architecture. The nForce IGP 210 also interfaces to an optional graphics processor 218 over an advanced AGP bus 217. In various computer systems, this optional graphics processor 218 may be removed, and the monitor 222 may be driven by the nForce IGP 210 directly. In other systems, there may be more than one monitor 222, some or all of which are coupled to optional graphics processor 218 or the nForce IGP 210 directly. The nForce IGP 210 communicates with the nForce MCP 220 over a HyperTransport™ link 221. The optional graphics processor 218, may also interface with external memory, which is not shown in this example. Embodiments of the present invention may be used to improve the memory interfaces to memories 212 and 214, from the optional graphics processor 218 to its external memory (not shown), or to other optional memories is not shown here, or other memory interfaces in other digital systems.

It will be appreciated by one skilled in the art that there are many modifications that may be made to this example consistent with the present invention. For example, the widths of the data and address buses may vary. Also, there may be more than two memory banks interfacing with the nForce IGP.

The nforce MCP 220 contains controllers for a home phoneline network 232, Ethernet connections 246 and soft modem 242. Also included are an interface for a mouse, keyboard, and printer 236, and USB ports for cameras and scanners 234, and hard drives 238.

This arrangement allows the CPU, the nForce IGP, and the nForce MCP, to perform processing independently, concurrently, and in a parallel fashion.

Figure 3:
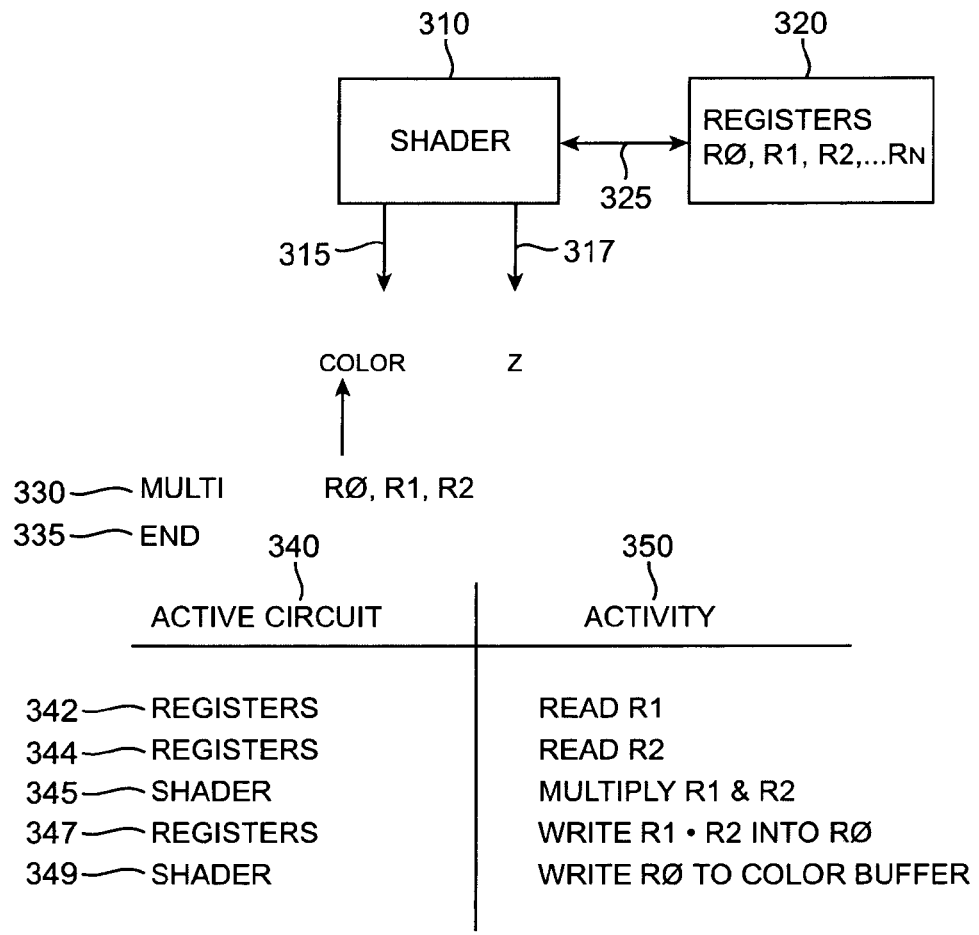
FIG. 3 is an illustration of a conventional shader circuit that may be improved by the incorporation of embodiments of the present invention.

FIG. 3 is an illustration of a conventional shader circuit that may be improved by the incorporation of embodiments of the present invention. Included are a shader 310 and a plurality of registers 320 coupled together over bus 325. The shader and registers are typically part of a graphics pipeline circuit that is part of the graphics processing unit in a system such as those shown in the first two figures. The shader interfaces with dedicated buffers which store pixel color and depth. These buffers are typically part of a graphics memory or frame buffer, and are accessed over buses 315 and 370, which may be part of a frame buffer interface circuit. When a graphics processing unit incorporating the shader and registers is formed on an integrated circuit, the color and depth buffer, and the rest of the frame buffer, are typically off chip, for example in an external DRAM, while the shader 310 and registers 320 are on chip.

The shader 310 typically receives fragments and textures, and operates on them by performing instructions contained in a shader program. The shader program may be loaded into the shader by a driver, for example.

An example of a portion of shader program is shown in lines 330 and 335. Line 330 is a multiplication instruction, where the contents of registers R1 and R2 are multiplied and stored in register R0. Line 335 is the end of this portion of the shader program. In columns 340 and 350, the above instructions are deconstructed into individual acts. For each of these acts, the circuit that is active and the activity that is performed by the active circuit is listed.

Specifically, line 342 shows that the register block initially reads the contents of register R1. In line 342, the register block reads the contents of register R2. In line 345, the shader multiplies the contents of R1 and R2. In line 347, the register block writes the product of R1 in R2 into register R0. In line 349, the shader program portion ends and the shader provides data to a raster operations circuit, which writes the contents of register R0 to the color buffer.

Again, the contents stored in the color buffer are not accessible for use by the shader in processing, for example, another fragment during the same GPU pass. That is, a later fragment cannot utilize a value stored in a buffer by an earlier fragment during the same GPU pass. Rather, the GPU pass must end, after which the graphics pipeline is flushed. During a subsequent GPU pass, data written during processing of the earlier fragment can be read by the shader as a texture and used by the shader in processing the later fragment. Unfortunately, this arrangement requires additional passes through the graphics pipeline in order to complete the processing of the later fragment.

Accordingly, embodiments of the present invention provide novel commands and supporting circuitry that allow a shader to read data from and write data to the frame buffer memory during a single GPU pass. This enables a later fragment to use data written by an earlier fragment during the same GPU pass. The commands are referred to as a pixel store, pixel load, conditional pixel store, and conditional pixel load commands.

The pixel store command writes data to a buffer in a frame buffer during a GPU pass. The pixel load command reads data from the frame buffer during a GPU pass. The conditional pixel store command stores data in the frame buffer if a condition is met, while the conditional pixel load command reads data from the buffer if a condition is met. Also, embodiments of the present invention may include read-modify-write commands.

Also, there is only one color and one depth or z-buffer available to the shader in this example. This limits the flexibility and programmability of that circuit. Accordingly, further embodiments of the present invention provide a shader having access to multiple buffers or locations in memory.

Figure 4:
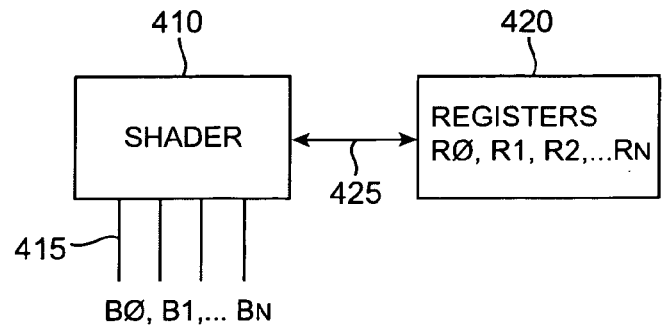
FIG. 4 is an illustration of a shader circuit including multiple buffers as provided by an embodiment of the present invention.

FIG. 4 is an illustration of a shader circuit including multiple buffers as provided by an embodiment of the present invention. Included are a shader 410 and a number of registers 420 coupled together over bus 425. The shader 410 is coupled to a number of buffers, which may be input, output, or input and output buffers. These buffers further may be read-only buffers or read/write buffers. This increase in the number of buffers allows for more steps or instructions to be executed per pass through the graphics pipeline, thus reducing the number of GPU passes required to process each fragment.

An exemplary portion of a shader program is shown as lines 430, 440, and 450. In line 430, the contents of registers R1 and R2 are multiplied and stored in register R0. In line 440, the contents of registers R0 and R1 are added and stored in register R1, while in line 450, this portion of the shader program ends. Since the shader 410 has access to multiple buffers, the contents of both R0 and R1 may be calculated and stored by shader 410.

Columns 460 and 470 list the active circuits and their activity for the above instructions. In order to multiply the contents of resisters R1 and R2 in store the results in R0, the following activities occur. The register block reads the contents R1, as shown in line 462. In line 464, the register block reads the contents of register R2. In line 466, the shader multiplies the contents of registers R1 and R2, while in 468, the registers write the product of R1 and R2 into register R0. For the addition in line 440 to occur, in line 472 the register block reads the contents of R0, while in line 474 the register block reads the contents of R1. In line 476, the shader adds the contents of registers R0 and R1, while in line 478, the register block writes the sum of R0 and R1 into R1. In line 482, the program portion comes to an end as the shader writes the contents of R0 and R1 into buffers in the frame buffer memory.

Again, in this way, by having multiple buffers accessible by shader 410, both a multiplication and addition result could be calculated and stored in a single GPU pass, whereas two GPU passes would be required by the prior art shader shown in FIG. 3. One skilled in the art will appreciate that this is simplified example, and that other shader program portions may access more buffers, and may read from and write to those buffers accordingly.

In the example of FIG. 4, the buffers are written to at the end of a GPU pass. However, since there are more buffers available, a further advantage may be gained by allowing reads and writes to those buffers at other times other than at the end of a GPU pass, that is by incorporating the store and load commands listed above. For example, in example in FIG. 4, it may be advantageous to store the contents of register R0 following the instruction of line 430. One reason for this may be that register R0 may be used for an addition or other operation following the instruction of line 430, and it may not be desirable to overwrite the contents of register R0.

Figure 5:
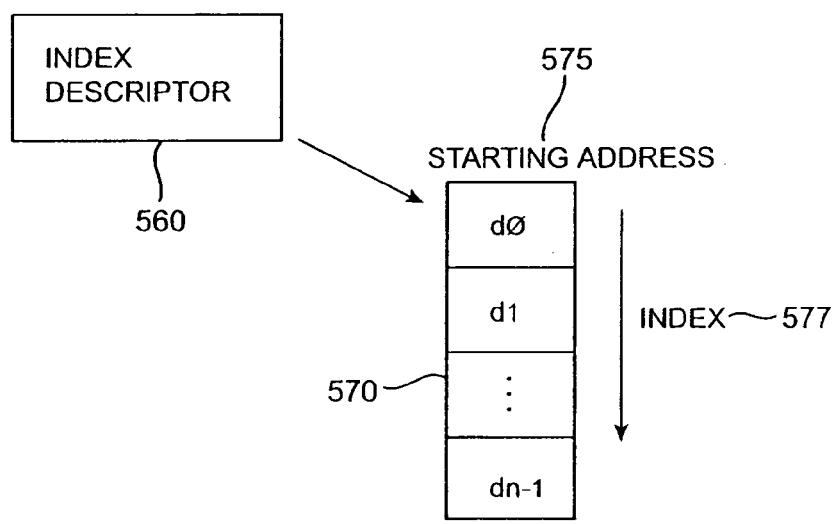
FIG. 5 includes a series of instructions illustrating the advantages of storing and loading data at positions in a shader program other than the end of a program or program portion.

An example of this can be seen in FIG. 5. FIG. 5 includes a series of instructions illustrating the advantages of storing and loading data at other points of a pass through a graphics pipeline other than the end of a GPU pass. Included are exemplary instructions 510, 520, 530, and 540. In instruction 510, the contents of registers R1 and R2 are multiplied and stored in register R0. In instruction 520, the contents of register R0 are stored in buffer $Z_L$. Instruction 530 directs that the contents of registers R3 and R4 be added and stored as the contents of register R0. In instruction 540, the contents of buffer $Z_H$ is loaded, or read, as the contents of register R1. In some embodiments of the present invention, a declaration statement identifying the number and possibly type of buffers may be included in a shader program.

In this particular example, the product of R1 and R2 is stored externally in buffer $Z_L$. Without the store instruction 520 available, the addition shown as instruction 530 would overwrite the contents of R0, and the resultant product found in line 510 would be lost. To avoid this, the shader program portion would end following instruction 510. Accordingly the availability of the store instruction as shown in line 520 allows for a longer shader program portion to be run before the next pass through the shader is started.

There are several methods consistent with embodiments of the present invention for these store and load instructions to be structured. Some specific examples that are consistent with embodiments of the present invention are shown as lines for 550, 552, 554, and 556. In line 550, the contents of register R0 are stored in a buffer specified by an identification. This is an indirect method, were the location of the buffer is fixed. In line 552, the contents of R0 are loaded into a buffer specified by R1. In this example, R1 may be indexed or movable, where the indices are tracked by the shader program. In line 554, the contents of register R0 are loaded into a buffer where the specific address is directly referenced in the instruction. In line 556, the contents of R0 are written to buffer R1, where the address is provided as a portion of the instruction itself. These examples apply to pixel stores also, as well as the conditional pixel load and conditional pixel store commands.

Block 560 represents an index descriptor that may be used in the above indirect storage methods and included in a graphics processor consistent with an embodiment of the present invention. This index descriptor contains a starting address of a location in the external graphics memory. By knowing the starting address and index 577, a buffer 570 may be located in the graphics memory.

Figure 6:
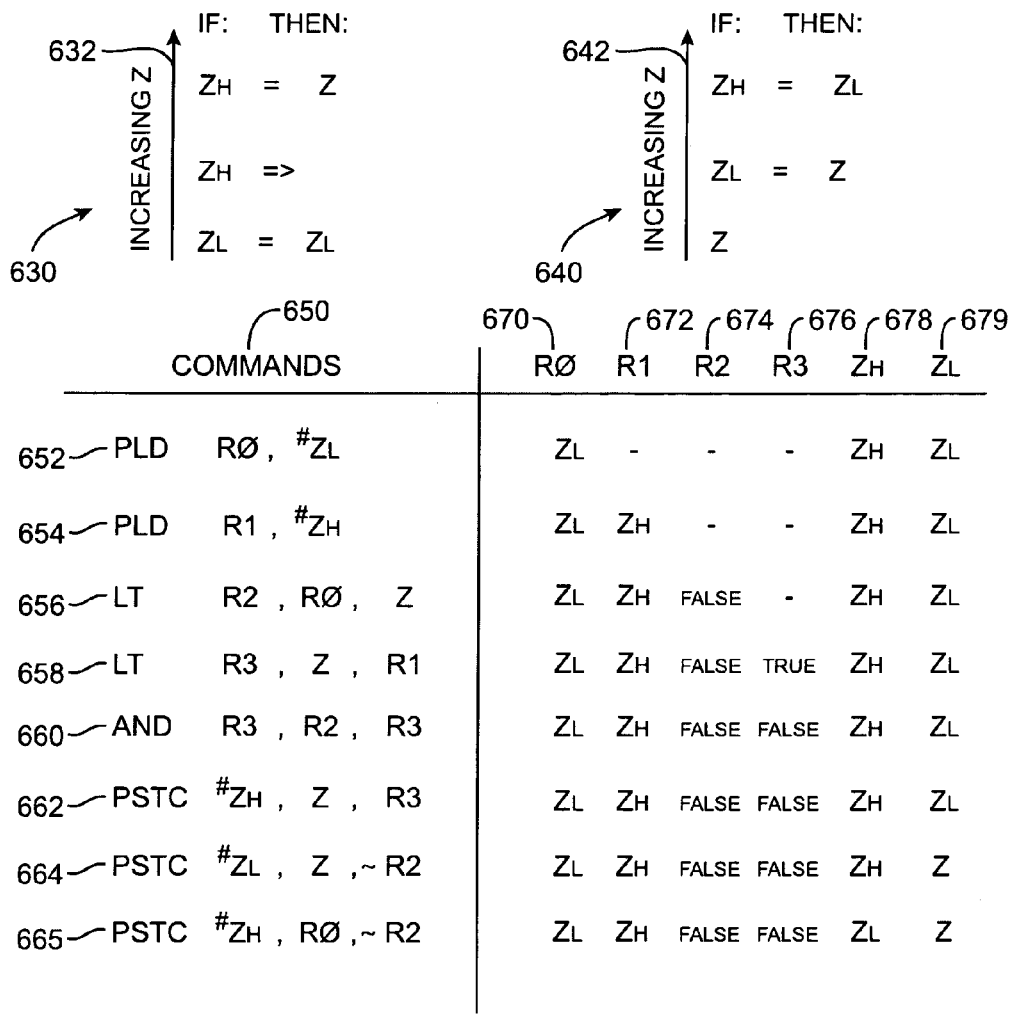
FIG. 6 illustrates a command sequence, the execution of which is greatly simplified by incorporation of embodiments of the present invention.

FIG. 6 illustrates a command sequence, the execution of which is greatly simplified by incorporation of embodiments of the present invention. In line 610, it is determined if the current value of Z is greater than a previously determined value of $Z_L$ and less than a previously determined value of $Z_H$. If it is, then the contents of $Z_H$ are replaced by the value of Z. In line 620, it is determined whether the current value of Z is less than contents of the buffer $Z_L$. If so, then the contents of $Z_L$ are replaced with the value of Z, and the contents of $Z_H$ are replaced by $Z_L$. This algorithm is useful in determining the visibility of fragments and fragment portions.

These situations are illustrated as 630 and 640. In example 630, increasing Z values are plotted along axis 620. In this example, $Z_H$ is larger than Z, which in turn is larger than $Z_L$. When this is the case, the contents of $Z_H$ are replaced by the value Z, and the contents $Z_L$ remain unchanged. Similarly, in example 640, the value of Z is less than $Z_L$, so the value of $Z_H$ is replaced by $Z_L$, while the contents of $Z_L$ are replaced by the value of Z.

A command sequence 650 may be executed to generate these results. In line 652, the contents of buffer $Z_L$ are loaded into register R0. In line 654, the contents of buffer $Z_H$ are loaded into register R1. In line 656, the values R0 and Z are compared, and a true/false result for R0<Z is stored in R2. In line 658, the values Z and R1 are compared, and a true/false result for Z<R1 is stored in R3. In line 660, R3 is set to the logical AND of R2 and R3. Line 662 is a conditional store, where Z is stored in $Z_H$ if R3 is true. Line 664 is also a conditional store, where Z is stored in $Z_L$ if R2 is false. Line 665 is a conditional store, where R0, which has the value of $Z_L$, is stored in $Z_H$ if R2 is false.

Columns 670, 672, 674, 676, 678, and 679 illustrate the contents of registers R0 R1, R2, and R1, and buffers $Z_H$ and $Z_L$, at each act of the command sequence 650. As can be seen, for the example where Z is less than $Z_L$ the final contents of registers $Z_H$ is the previous value $Z_L$, while the final contents of buffer $Z_L$ is the current value of Z.

The lines 662, 664, and 665 above highlight the usefulness of the conditional load (PLDC) and conditional store (PSTC) commands that are provided by embodiments of the present invention. These commands may be used to conditionally load and store values base on the content of a register or other location.

Figure 7:
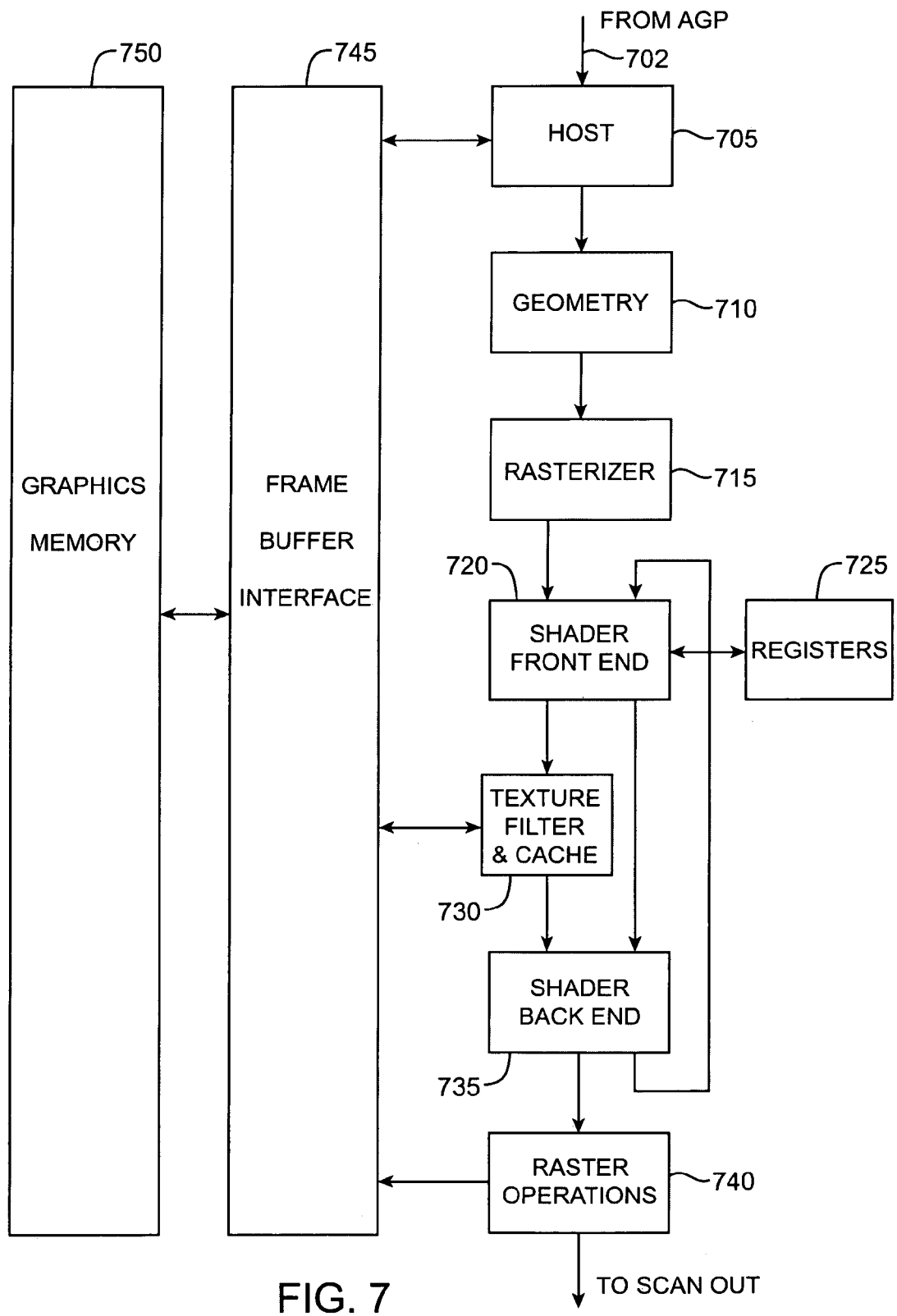
FIG. 7 is an illustration of a graphics pipeline including embodiments of the present invention.

FIG. 7 is an illustration of a graphics pipeline including embodiments of the present invention. Included are a host 705, geometry engine 710, rasterizer 715, shader front end 720, registers 725, texture filter and cache 730, shader back end 75, raster operations or ROP circuit 744, buffer interface 745, and graphics memory 750.

The host 705 receives primitives and textures from the AGP bus on lines or bus 702. The host provides the primitives to geometry engine 710, which processes them and outputs the result to the rasterizer 715. The rasterimer 715 provides fragments to the shader front end 720, which in turn couples to the registers 725. The shader front end 720 runs portions of the shader program and provides outputs to the texture filter 730 and shader back end 735. The texture unit 730 receives textures from the graphics memory 750 via the frame buffer interface 745, and provides them to the shader back end after optional filtering. The shader back end 735 also runs portions of the shader program and provides outputs to the raster operations circuit 740 and the shader front end 720. Specifically, for each pass through the shader, a number of fragments being operated on pass through the shader front end and shader back end once. When the passes that are required are completed, the shader provides an output to the raster operations circuit 740. Accordingly, there may be several shader passes occurring during each GPU pass.

The shader writes data to the frame buffer during a GPU pass via the raster operations circuit 740. Specifically, an arbiter circuit (not shown) in the rasterizer 715, shader 720 or raster operations circuit 740 selects data from the shader or raster operations circuit 740 and writes data to the frame buffer memory 750 via the frame buffer interface 745. This process includes what is referred to as memory position (or location) conflict detection mechanism (through interlocking), details of which can be found at copending U.S. patent application Ser. No. 10/736,006, titled.

The shader reads data from the frame buffer interface during a GPU pass via the texture circuit 730. Specifically, the shader reads data from the frame buffer or graphics memory 750 via the frame buffer interface 745 as textures. In other embodiments, the shader may read data from and write data to the graphics memory 750 using the frame buffer interface 745 directly. In even another embodiment, the shader may read data from and write data to the system memory using the AGP or similar port.

In this way, the shader can read data written earlier during the same GPU pass. For example, during the processing of a first fragment, data may be written to the graphics memory 750. During the same GPU pass, the shader may read that data and use it in processing a subsequent fragment. Also, the read may be a read-modify-write activity.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
a graphics pipeline; and
a frame buffer interface,
wherein the graphics pipeline comprises a shader coupled to a texture cache, the shader further coupled to the frame buffer interface,
wherein the shader stores and loads data to and from an external graphics memory using the frame buffer interface, and the shader is configured to store and load data to and from specific locations in the external graphics memory during a single pass through the graphics pipeline.

2. The integrated circuit of claim 1 wherein the shader executes instructions forming a shader program, the shader program executed during a plurality of passes.

3. The integrated circuit of claim 2 wherein one of the plurality of passes comprises:
executing a first plurality of instructions;
executing a read command, wherein data is read from a buffer in the external graphics memory and received by the shader using the frame buffer interface; and
executing a second plurality of instructions.

4. The integrated circuit of claim 3 wherein the first number of buffers are read-only buffers.

5. The integrated circuit of claim 2 wherein one of the plurality of passes comprises:
executing a first plurality of instructions;
executing a write command, wherein data is written to a buffer in the external graphics memory by the shader using the frame buffer interface; and
executing a second plurality of instructions.

6. The integrated circuit of claim 1 wherein the shader is configured to write to and read from a first number of buffers located in the external graphics memory, the first number greater than two.

7. The integrated circuit of claim 6 wherein the first number of buffers are read/write buffers.

8. A method of generating a computer graphics image comprising:
   executing a first plurality of instructions in a shader program, the shader program running in a shader in a graphics pipeline, the shader program executed during a plurality of passes through the shader;
   executing a load command, wherein data is read from a first buffer by the shader; and
   executing a second plurality of instructions in the shader program,
   wherein the first plurality of instructions, the load command, and the second plurality of instructions are executed during a single pass through the shader.

9. The method of claim 8 wherein the shader is configured to load data from a plurality of buffers, the plurality of buffers exceeding two buffers.

10. The method of claim 8 further comprising:
    executing a store command, wherein data is stored by the shader in a second buffer; and
    executing a third plurality of instructions in the shader program,
    wherein the first plurality of instructions, the load command, the second plurality of instructions, the store command, and the third plurality of instructions are executed during a single pass through the shader.

11. The method of claim 10 wherein the shader is configured to store data in and load data from a plurality of buffers, the plurality of buffers exceeding two buffers.

12. The method of claim 11 wherein the buffers are located in an external graphics memory.

13. The method of claim 12 wherein the shader stores data in and loads data from the buffers using a frame buffer interface.

14. A method of generating a graphics image using an integrated circuit, the integrated circuit comprising:
    a frame buffer interface configured to read data from and write data to a graphics memory; and
    a graphics pipeline comprising a shader, the shader coupled to the frame buffer interface;
    the method comprising:
    executing a shader program using the shader, the shader program executed during a plurality of passes, one of the plurality of passes comprising:
       executing a first plurality of instructions;
       executing a write command, wherein data is written to a first buffer in the graphics memory by the shader using the frame buffer interface; and
       executing a second plurality of instructions.

15. The method of claim 14 wherein the shader is configured to access a plurality of buffers in the graphics memory using the frame buffer interface.

16. The method of claim 15 wherein the shader is coupled to a texture cache.

17. The method of claim 14 further comprising:
    executing a read command, wherein data is read from a second buffer in the graphics memory by the shader using the frame buffer interface; and
    executing a third plurality of instructions.

18. The method of claim 17 wherein the read and write commands in the shader program include storage location identifications.

19. The method of claim 17 wherein read and write commands in the shader program include a direct reference to storage location addresses in the graphics memory.

20. The method of claim 17 wherein read and write commands in the shader program include indirect references to storage location addresses in the graphics memory.

* * * * *